United States Patent [19]

Sommermeyer

[11] 3,804,257

[45] Apr. 16, 1974

[54] FLUID FLOW FILTER UNIT WITH MAGNETIC AND/OR MECHANICAL FILTER MEANS

[76] Inventor: Heinrich Sommermeyer, Ronneburger Strasse 13, 65, Gera/Thuringia, Germany

[22] Filed: Aug. 7, 1972

[21] Appl. No.: 278,520

Related U.S. Application Data

[63] Continuation of Ser. No. 81,942, Oct. 19, 1970, abandoned.

[52] U.S. Cl. ................................. 210/335, 210/223
[51] Int. Cl. ........................................... B01d 29/00
[58] Field of Search .......... 210/322, 323, 169, 259, 210/282, 252, 253, 260, 365, 416, 330, 343, 335

[56] References Cited
UNITED STATES PATENTS

| | | | |
|---|---|---|---|
| 2,359,985 | 10/1944 | Gordon | 210/336 |
| 3,447,684 | 6/1969 | Morrison | 210/340 |
| 3,329,270 | 7/1967 | Hortowski | 210/340 |
| 457,008 | 8/1891 | Oster | 210/340 |
| 2,511,637 | 6/1950 | Johannes | 210/222 |

Primary Examiner—Samih N. Zaharna
Assistant Examiner—T. A. Granger
Attorney, Agent, or Firm—Albert C. Nolte, Jr.; Edward B. Hunger; C. Bruce Hamburg

[57] ABSTRACT

A dual filter with magnetic and/or mechanical filter members. The filter housing is generally rectangular in cross-section. The filters are removably and interchangeably mounted therein.

2 Claims, 3 Drawing Figures

3,804,257

FLUID FLOW FILTER UNIT WITH MAGNETIC AND/OR MECHANICAL FILTER MEANS

This is a continuation, of application Ser. No. 81,942 filed Oct. 19, 1970 now abandoned.

The present invention relates to multiple filters in series arrangement. Desirably, a pair of filtering means, mechanical or magnetic or a combination of both, are connected in series relationship in a housing of rectangular cross-section. They provide for removing extremely small contaminants from fluids. The structures of such filters must always correspond to a particular application of the filter, for example, installation in a conduit, building into an appliance, or building up on an appliance cabinet. These variations place a heavy burden on the manufacturer of the filters as to keeping stock, especially when one also considers the multiplicity of flowthrough capacities customarily used.

It is therefore, an object of the present invention to provide a dual filter having several magnetic or several mechanical filtering means, or a combination of both, and the housing of which can be made so that the filter becomes available for conduit type and other applications.

According to the invention the cross section of the filter housing is rectangular, and surrounds magnetic or mechanical filters or combination of both, which have the form of columns. The invention provides that the magnetic filter is spaced from the inlet and outlet apertures, while the mechanical filter tightly abuts the inlet and outlet apertures. Advantageously the rectangular filter housing is provided, on all or preferred outer surfaces, near its edges, with grooves for receiving securing means.

The invention will become more readily apparent from the following description of preferred embodiments thereof, shown in the accompanying drawing, in which.

Figure 1:
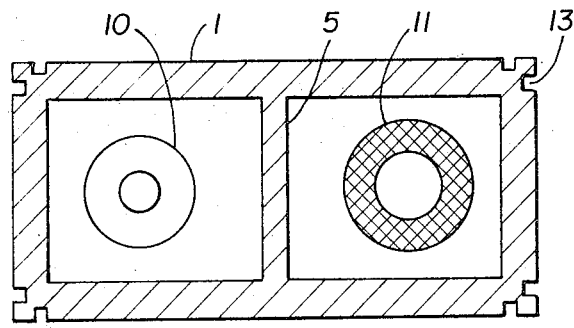
FIG. 1 is a cross section in plane view of a filter cabinet according to the present invention, with magnetic and mechanical filters therein.
Figure 2:
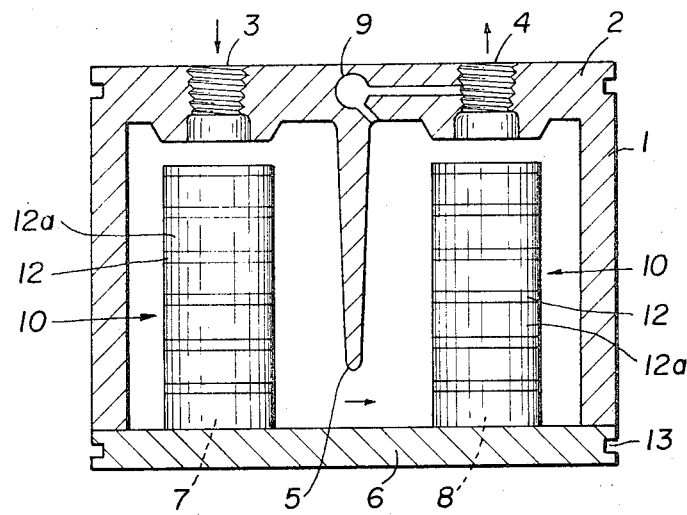
FIG. 2 is a longitudinal sectional view through a similar cabinet with magnetic filters.
Figure 3:
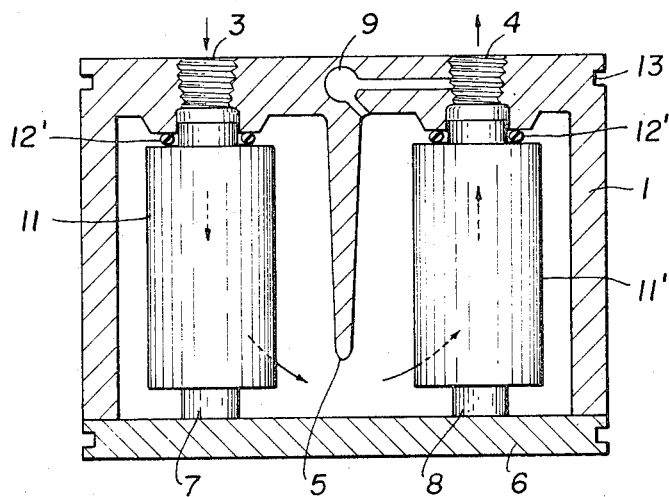
FIG. 3 is a longitudinal section through a similar cabinet with mechanical filters.

With reference to FIGS. 1 - 3 housing 1 has rectangular shape. It is formed as a pot which has a top plate 2 provided with tapped apertures 3 and 4 serving as inlet and outlet respectively and to which inlet and outlet pipes (not shown) are connected. Of course in actual use, this plate may be positioned at the bottom. Housing 1 is divided into two filtering chambers by a rib member 5 connected to inner walls of the housing 1 and projecting into the inner space from top plate 2. Rib member 5 terminates short of the opposite wall of the housing. A cover plate 6 is provided which is tightly secured to seal housing 1 by suitable fastening means (not shown).

On cover plate 6 there are provided securing devices 7 and 8 for filtering members schematically shown as 10 or 11, the reference numeral 10 identifying magnetic filter discs, while the reference numeral 11 identifies a mechanical filter cartridge. The securing means 7 and 8 provide for quick interchange and removal of the respective filter means. The tapped apertures 3 and 4, or one of them, may be connected to indicating high pressure relief valve means, not shown, which can be disposed in a chamber 9 in the housing.

As shown in FIG. 2, cover plate 6 has a pair of magnetic filters 10 mounted thereon, which may comprise magnetic discs 12 with polarized end surfaces, abutting against soft iron discs 12a placed therebetween. Their total height is selected in such a manner that a sufficiently large annular gap is left for in and out-flow over them near inlet and outlet apertures 3, 4.

As shown in FIG. 3 a pair of mechanical filters 11, 11' are mounted in the housing. Both have filter cartridges centered in inlet or outlet apertures 3, 4, and sealed against plate by gaskets 12'. Filter 11 is arranged for flow from inlet aperture 3 to its inside while filter 11' is arranged for flow from its inside to outlet 4.

Housing 1, near its edges, is provided with narrow grooves 13, which run along the edges, for securing the filter body in place by suitable fasteners (not shown).

From the above, it is apparent that although the invention has been described hereinbefore with respect to certain specific embodiments thereof, many modifications and changes may be made without departing from the spirit of the invention. Accordingly, by the appended claims, it is intended to cover all such modifications and changes as fall within the true spirit and scope of this invention.

What is claimed is:

1. Dual separator unit for two serial separations, comprising a rectangular housing having a top wall, four side walls integral with the top wall and a cover member detachably mounted on the side walls and forming the bottom wall of the housing, a rib member extending essentially perpendicularly from the top wall toward the cover member, having a free edge spaced from the cover member and extending laterally to a pair of the side walls thereby to form in the housing two rectangular chambers in mutual communication at the space between the free edge of the rib member and the cover member, a respective cylindrical separator in each of the chambers with the axis of each thereof essentially perpendicular to the top wall, a first cylindrical aperture passing through the top wall coaxially with the separator in one of the chambers and adapted to admit a fluid to be separated into said one chamber, a second cylindrical aperture passing through the top wall coaxially with the separator in the other of the chambers and adapted to permit exit of a fluid which has been separated in the two chambers, means for containing a high pressure relief valve and passage means communicating between at least one of the apertures and said containing means, whereby the fluid to be separated enters said one chamber from outside the housing through the first aperture wherein it is separated by the separator contained in said one chamber, the fluid then passes through the space between the free edge of the rib member and the cover member into said other chamber wherein it is separated by the separator contained in said other chamber, the fluid then passes out of said other chamber to outside the housing through the second aperture and the pressure in the housing is transmitted to said means for containing a high pressure relief valve through said passage means communicating between at least one of the apertures and said containing means.

2. Dual separator unit according to claim 1, in which a pair of grooves for securing the unit in place with securing means is formed on exterior surfaces of each of the side walls, each of the grooves being immediately adjacent and parallel to a respective edge of the side wall essentially perpendicular to the top wall, another pair of grooves for securing the unit in place by means of fasteners is formed on exterior surfaces of the top wall contiguous with exterior surfaces of a respective pair of the side walls, said other pair of grooves being immediately adjacent and parallel to a pair of respective opposed edges of the top wall, and yet another pair of grooves for securing the unit in place by means of fasteners is formed on exterior surfaces of the cover member contiguous with exterior surfaces of a respective pair of the side walls, said yet other pair of grooves being immediately adjacent and parallel to a pair of respective opposed edges of the cover member parallel to said pair of opposed edges of the top wall.

* * * * *